(12) United States Patent
Cheriton

(10) Patent No.: US 12,373,439 B2
(45) Date of Patent: *Jul. 29, 2025

(54) APPROXIMATE MATCHING

(71) Applicant: OptumSoft, Inc., Vero Beach, FL (US)

(72) Inventor: David R. Cheriton, Vero Beach, FL (US)

(73) Assignee: OptumSoft, Inc., Vero Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,496

(22) Filed: May 22, 2023

(65) Prior Publication Data

US 2023/0394044 A1 Dec. 7, 2023

Related U.S. Application Data

(63) Continuation of application No. 16/749,771, filed on Jan. 22, 2020, now Pat. No. 11,693,860.

(60) Provisional application No. 62/799,613, filed on Jan. 31, 2019.

(51) Int. Cl.
*G06F 16/2455* (2019.01)
*G06F 17/16* (2006.01)

(52) U.S. Cl.
CPC ........ *G06F 16/24558* (2019.01); *G06F 17/16* (2013.01)

(58) Field of Classification Search
None
See application file for complete search history.

(56) References Cited

U.S. PATENT DOCUMENTS

| 3,715,811 A | | 2/1973 | Thompson | |
|---|---|---|---|---|
| 5,802,028 A | * | 9/1998 | Igarashi | G11B 27/329 369/30.07 |
| 5,907,320 A | * | 5/1999 | Beesley | G06F 16/40 715/269 |

(Continued)

FOREIGN PATENT DOCUMENTS

| CN | 108369539 | 8/2018 |
|---|---|---|
| WO | 2014038306 | 3/2014 |

OTHER PUBLICATIONS

Practical Data Science, "Vectors, matrices, and linear algebra," Aug. 24, 2018 (Year: 2018).*

(Continued)

*Primary Examiner* — Yu Zhao
(74) *Attorney, Agent, or Firm* — Van Pelt, Yi & James LLP

(57) ABSTRACT

A first set of subconditions is obtained. Approximate matching of the first set of subconditions against a plurality of sets of subconditions is performed. A second set of subconditions among the plurality of sets of subconditions is accessed, wherein a representation of a subcondition in the first set and/or the second set of subconditions comprises a value having one of a plurality of states, and wherein the plurality of states comprises a state of "don't care". The first set of subconditions is approximately matched against the second set of subconditions. The first set of subconditions is compared against the second set of subconditions. A matching criterion is determined to be met based on a result of the matching. Information indicating that the second set of subconditions is at least an approximate match for the first set of subconditions is output.

23 Claims, 5 Drawing Sheets

(56) References Cited

U.S. PATENT DOCUMENTS

| | | | | |
|---|---|---|---|---|
| 5,995,971 | A | * | 11/1999 | Douceur ............. G06F 16/9027 |
| | | | | 710/72 |
| 9,665,801 | B1 | | 5/2017 | Koch |
| 2002/0013775 | A1 | | 1/2002 | Skovgaard |
| 2003/0195836 | A1 | | 10/2003 | Hayes |
| 2004/0111392 | A1 | | 6/2004 | Indeck |
| 2005/0071097 | A1 | * | 3/2005 | Nachamkin ............. G06F 30/23 |
| | | | | 702/65 |
| 2005/0154710 | A1 | | 7/2005 | Ruhlow |
| 2008/0320056 | A1 | | 12/2008 | Mohanan |
| 2010/0125574 | A1 | * | 5/2010 | Navas ................. G06F 16/2471 |
| | | | | 707/E17.014 |
| 2011/0161274 | A1 | | 6/2011 | Gao |
| 2012/0265717 | A1 | * | 10/2012 | Narayanan .......... G06F 18/2411 |
| | | | | 706/12 |
| 2013/0259211 | A1 | | 10/2013 | Vlack |
| 2014/0108718 | A1 | | 4/2014 | Chen |
| 2014/0173687 | A1 | | 6/2014 | Dimitrakos |
| 2015/0066862 | A1 | | 3/2015 | Anderson |
| 2019/0114380 | A1 | * | 4/2019 | Lawrence .............. G06N 20/20 |
| 2021/0226834 | A1 | * | 7/2021 | Shattil ................. H04L 27/2621 |

OTHER PUBLICATIONS

Amir et al., Approximate Subset Matching with Don't Cares, SODA '01 Proceedings of the 12th Annual ACM-SIAM Symposium on Discrete Algorithms, Jan. 2001.

Graf et al., Hamming Distance Completeness and Sparse Matrix Multiplication, May 3, 2018.

Hall et al., Approximate String Matching, Computing Surveys, vol. 12, No. 4, Dec. 1980.

Iliopoulos et al., Weighted Degenerated Approximate Pattern Matching, Jan. 2007.

Melody Smith, TaxoDiary, Limitations of Fuzzy Matching of Lexical Variants, Apr. 14, 2014.

Yuri Rabover, Intergrated Diagnostics of Root Cause Faults in Complex Network and Systems, Apr. 7, 2009.

\* cited by examiner

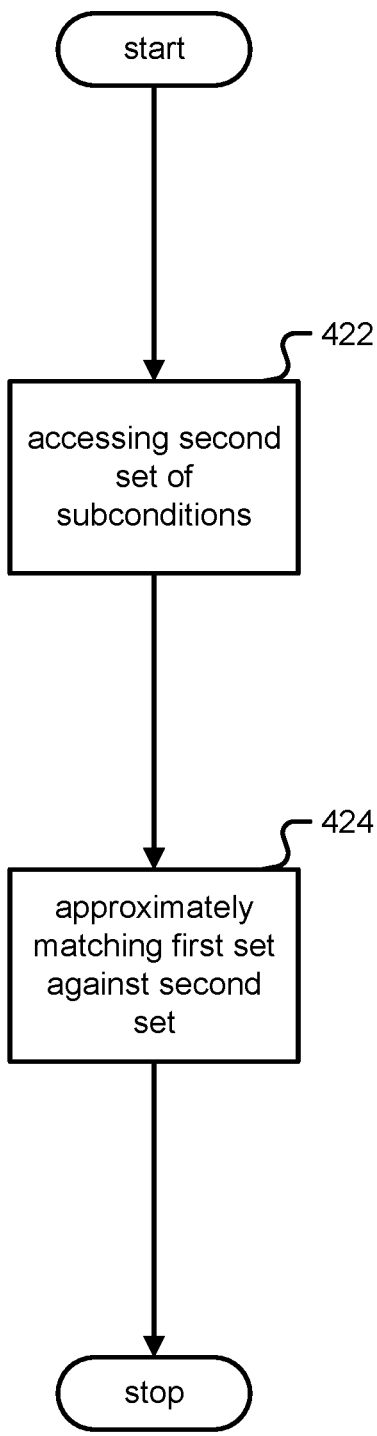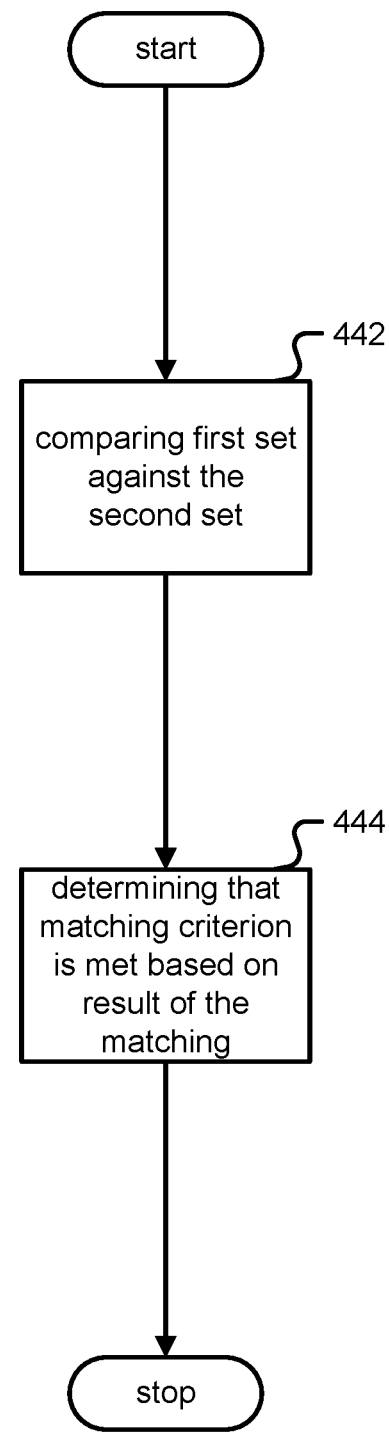
FIG. 4B
FIG. 4C

APPROXIMATE MATCHING

CROSS REFERENCE TO OTHER APPLICATIONS

This application is a continuation of U.S. patent application Ser. No. 16/749,771, entitled APPROXIMATE MATCHING filed Jan. 22, 2020 which is incorporated herein by reference for all purposes, which claims priority to U.S. Provisional Application No. 62/799,613, entitled APPROXIMATE MATCHING filed Jan. 31, 2019 which is incorporated herein by reference for all purposes.

BACKGROUND OF THE INVENTION

Matching of values of a row against a table may be used in various fields, for example root cause analysis, rule-based systems, and database queries using indices. Using exact matching for this matching of values may be efficient in terms of processing resources, but as the size of the data increases, using exact matching may suffer from an exponential growth of potential matches that slow down processing and may also take up too much memory and/or networking resources.

BRIEF DESCRIPTION OF THE DRAWINGS

Various embodiments of the invention are disclosed in the following detailed description and the accompanying drawings.

FIGS. 4A, 4B, and 4C are flow charts illustrating an embodiment of a process for approximate matching.

DETAILED DESCRIPTION

Figure 1:
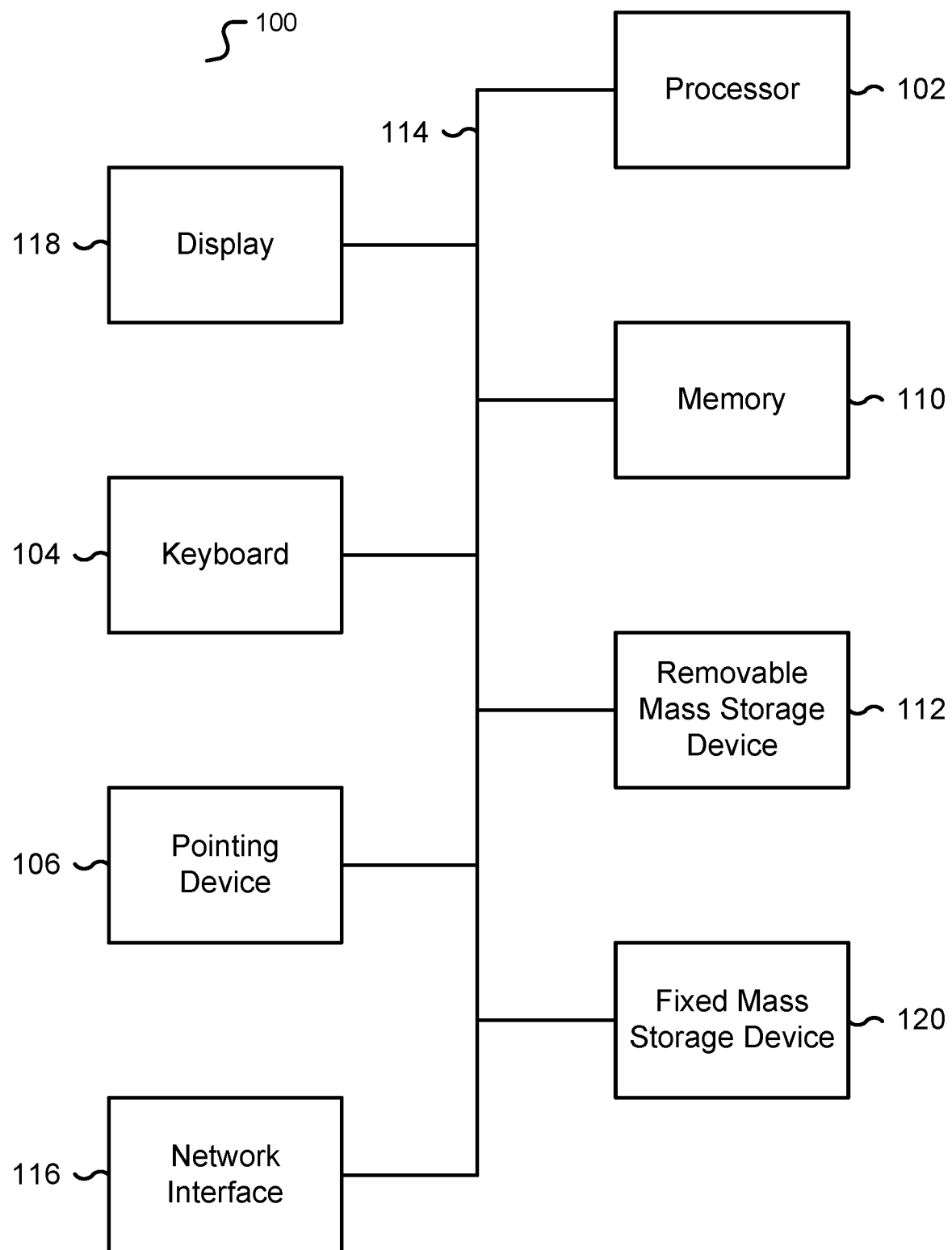
FIG. 1 is a functional diagram illustrating a programmed computer/server system for approximate matching in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Parametrized matching is disclosed. Exact matching of values of a row against a table is efficient and useful when values have one of a plurality of states, and wherein the plurality of states comprise a state of "don't care," for example, if the plurality of states are two states such as a binary representation with a "true" state and a "don't care" state, if the plurality of states are three states such as a ternary representation with a "true" state, "false" state, and a "don't care" state, if the plurality of states are four states such as a quaternary representation with a "true" state, "false" state, a "not known to be true" state, and a "don't care" state, etc. Useful applications of such exact matching include rules-based engines with subconditions, for example in the automatic root cause analysis domain, wherein a table includes a root cause table of symptoms and a row includes an actual fault scenario.

Various techniques address an issue, that in some contexts, the exact set of symptoms is not known or totally correct. As one technique, a "partial match" operation provides multiple matches with additional rows that correspond to a partial match as well as a row that corresponds to a complete match. This technique may be refined in which some of the multiple matches may be suppressed as being subsumed by other matches.

This table matching mechanism may be generalized to an "index table" in which columns are viewed as corresponding to subconditions, rather than symptoms. Specific examples are given for "subconditions" and a "mask," as generalizations of symptoms and the actual fault scenario, respectively. Another specific example of a "subcondition table" is used as a generalization of a root cause table. Any person having ordinary skill in the art appreciates that the disclosed applies to the general case of subconditions and masks without limitation of the specific examples of root cause analysis, rule-based systems, and indexed database queries.

Approximate matching for recognition problems is disclosed. For example, in a Medical Diagnosis Application that recognizes different types of diseases and disorders from patient symptoms, there may be K different subconditions or features associated with some disease yet it may be sufficient to match on K−1 features, given one symptom may be wrong or missing. Trying to handle this case using exact matching may require introducing K additional rows, one for each feature where the i-th row has the i-th feature entry set to "don't care." Furthermore, when a mask has all K subconditions set appropriately, for example with low overlap, a match produces all K rows, or K+1 if there is also a row corresponding to all K subconditions set to their actual values. These solutions are even more complex if the application accepts matches with up to two mismatching entries, requiring $K^2$ additional rows, or three mismatching entries, requiring $K^3$ additional rows. Thus, using exact matching may suffer from an exponential growth of potential matches. Exact matching also becomes more challenging if an application needs to select a distance or other threshold for matching dynamically.

Approximate matching for this case and other applications in which not all features and/or subconditions are necessarily known is disclosed. As referred to herein, an "approximate match" is based at least in part on a result of a specified matching function applied between a subcondition row and a mask. Examples of the specified matching function are a distance threshold function and a strength threshold function.

Binary, ternary, and quaternary representation. In one embodiment, a value has three or more states, including the values of "true," "false," and "don't care." In one embodiment, ternary subcondition values are used so that a subcondition is represented as a "known" bit indicating known or unknown by the bit value being true or false respectively, and a second "value" bit that indicates true or false, which is only interpreted as such if the "known" bit is set to true. A quaternary representation using two bits to represent a ternary value is referred to herein as [a, b] wherein a is whether a state is known (0=unknown, 1=known) and b is a value associated with the state (0=false, 1=true). With this convention, an interpretation of [0,1] that is allowable is that an associated subcondition is "not known to be true." Compare [0,0], which may correspond to the state of unknown, with [0,1], which may be interpreted as "not known to be true" (An alternate convention may be that [0,0] is "not known to be false".) Completing the possibilities, a [1,0] may correspond to be "false" and [1,1] may correspond to be "true" . . . " Note that a [0,1] subcondition may match to an input that is false or unknown, and is unlike [0,0], which does not match any input to true. Thus [0,1] may not necessarily be treated the same as [0,0] and/or may not be allowed in an internal and/or consistent representation.

In one embodiment, a value has two states that allow for different matching behavior for different columns of the table. For a value with binary states, in many applications an object has a symptom or else the clients "don't care," for example an object representing isOverheating (that is, whether a unit is overheating). A "true" for isOverheating indicates a symptom for a particular issue, but there may be many root causes that are not related to whether the unit overheats and is thus "don't Care". Recognizing this, an alternative approach is to have two values per entry rather than three, corresponding to "true" and "don't care." A corresponding match operator output table is:

|  | Table Entry | |
| --- | --- | --- |
| Input | "don't care" | "true" |
| "don't care" | match | no-match |
| "true" | match | match |

This reduces the number of bits required per entry from two bits for a ternary representation to one bit for binary representation, as is thus half as expensive in memory.

There are cases in which there is a need to match on both an entity having a symptom S1 as well in a separate rule/root cause, not having a symptom, such as S1 is false. For this case, an extra symptom S2 may be explicitly introduced that corresponds to the negation of S1, for example a symptom S1 may be lossOfPower and S2 may be hasPower. Then, a row that requires lossOfPower may have the corresponding table entry for symptom S1 set to "true" and S2 set to "don't care." Conversely, a row that requires hasPower may have that corresponding table entry for S2 set to "true" and the S1 entry set to "don't care." Thus, if for example ten percent of the symptoms require negation, a 1-bit approach would still be less expensive in space than the 2-bit approach, that is, an extra 10 percent space but not 100 percent more.

In one embodiment, a combination of S1 and S2 both being true may correspond to "unknown." That is, if the input sets both S1 and S2 then the symptom is treated as "unknown." Representing a state as "unknown" may be more useful in applications than a "not known to be true" interpretation of a fourth value. There is no change or extension to the above matching for this "unknown" support to work. The S1 and S2 entries in a row both specify true, and the input specifies these entries as true as well, so it matches on "unknown."

There are also symptoms that are effectively a discrete enumeration of values, such as very cold, cold, cool, normal, warm, hot, and very hot. These seven values may be represented in three bits in a normal binary representation. However, with the above "true"/"don't care" binary approach, one would need six symptoms for the positive and the negation as separate symptoms for each bit. In particular, the above 7 enumerations can be represented in 3-bits using a normal Boolean representation, e.g. 001 could designate "very cold". However, because the true/don't care embodiment does not explicitly handle false, another 3 bits or symptoms are required are required to specify false, i.e. 0. Therefore, the 001 encoding for "very cold" would be indicated the six symptoms [X,X,1,1,1,X] here "X" designates "don't care" and the first 3 entries correspond to true or 1 values and the second 3 entries correspond to the false or 0 entries. Alternately, seven separate symptoms for a "one-hot" representation of these seven values may be used, where the "one-hot" representation is referred to herein as a group of bits wherein legal combinations of values are only those with a single "true" bit and all the others not "true".

In one embodiment, a specific set of columns used by symptoms representing such an enumeration of multiple symptom values is used. In this case, specific columns are designated as being matched as "true"/"false," as opposed to "true"/"don't care" to represent the enumeration in three columns, rather than six or seven. There is still a need for a "don't care" value so that a row that does not care about the value of this enumeration symptom may indicate this. Thus, the designation of a column value width is allowed and one value reserved to indicate "don't care," for example, all zeros. In this case, a logical column width of three bits may be designated so [0,0,0] may correspond to "don't care", while the remaining seven combinations of values represent the seven different symptom states respectively." Therefore, this enumeration may be represented in three bits, yet still allows "don't care" to be specified in rows that do not care about the enumeration symptom.

Therefore, this additional extension allows the table designation of logical column width and treating the all zeros case as "don't care." Then, the columns corresponding to isOverheating or S1,S2 may be tagged as one-bit width whereas the columns corresponding to the above enumeration would be tagged as one logical column of three bits.

In one embodiment, an efficient representation of column width is having a bit per column that is set if the next column is also part of a logical column/entry spanning multiple columns. Equivalently, the bit may indicate a continuation of the previous column. Thus, the columns corresponding to the enumeration may be tagged as [1,1,0], wherein the last bit indicates that there is no continuation beyond the third column to indicate three-bit columns that form one logical column/entry.

Generally, the table may designate column widths as well as the matching behavior for a logical column. As an example of this more general case, the table may designate a logical column as being five bits wide and the matching behavior being a test for "greater than." That is, the input may match on this entry if its value in these five bits was a binary value that was greater than the value in the table entry, except treating the table entry as "don't care" if it is zero or as "unknown" if it is all ones. As another example of specified matching behavior, it may designate the matching behavior as the logical OR of the input across these columns. By having one bit in the logical column that indicates whether the symptom is relevant to this row and excluding that from the OR, the all zeros value in a table entry may be treated as "don't care."

In one embodiment, hardware instructions such as the "ANDN" or logical AND NOT instruction in the Intel and AMD instruction set may be used with a binary representation. Hardware instructions are generally faster to execute and more efficient to program than their software counterparts. The ANDN instruction performs a bitwise logical AND with an inverted first operand and a second operand, for example, with the result of mismatch for two operated inBlock and tableBlock as follows:

mismatch=~inBlock & tableBlock with corresponding output table:

| inBlock | tableBlock | |
| --- | --- | --- |
| | "don't care" = 0 | "true" = 1 |
| "don't care" = 0 | mismatch = 0 | mismatch = 1 |
| "true" = 1 | mismatch = 0 | mismatch = 0 | and thus if mismatch is the complement of match,

| inBlock | tableBlock | |
| --- | --- | --- |
| | "don't care" = 0 | "true" = 1 |
| "don't care" = 0 | match | mismatch |
| "true" = 1 | match | match |

FIG. 1 is a functional diagram illustrating a programmed computer/server system for approximate matching in accordance with some embodiments. As shown, FIG. 1 provides a functional diagram of a general purpose computer system programmed for approximate matching in accordance with some embodiments. As will be apparent, other computer system architectures and configurations may be used for approximate matching.

Computer system 100, which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general purpose digital processor that controls the operation of the computer system 100. Using instructions retrieved from memory (110), the processor (102) controls the reception and manipulation of input data, and the output and display of data on output devices, for example display and graphics processing unit (GPU) (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as is well known in the art, primary storage typically includes basic operating instructions, program code, data, and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system 100, and is coupled either bi-directionally (read/write) or uni-directionally (read only) to processor (102). For example, storage (112) can also include computer-readable media such as flash memory, portable mass storage devices, holographic storage devices, magnetic devices, magneto-optical devices, optical devices, and other storage devices. A fixed mass storage (120) can also, for example, provide additional data storage capacity. One example of mass storage (120) is an eMMC or microSD device. In one embodiment, mass storage (120) is a solid-state drive connected by a bus (114). Mass storages (112), (120) generally store additional programming instructions, data, and the like that typically are not in active use by the processor (102). It will be appreciated that the information retained within mass storages (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a communication interface (116), a touch (or physical) keyboard (104), and one or more auxiliary input/output devices (106) including an audio interface, a sound card, microphone, audio port, audio recording device, audio card, speakers, a touch (or pointing) device, and/or other subsystems as needed. Besides a touch screen and/or capacitive touch interface, the auxiliary device (106) can be a mouse, stylus, track ball, or tablet, and is useful for interacting with a graphical user interface.

The communication interface (116) allows processor (102) to be coupled to another computer, computer network, or telecommunications network using a network connection as shown. For example, through the communication interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system 100 to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor (102) through communication interface (116).

An auxiliary I/O device interface, not shown, can be used in conjunction with computer system 100. The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example, a script that can be executed using an interpreter.

The computer/server system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems may also be utilized.

Figure 2:
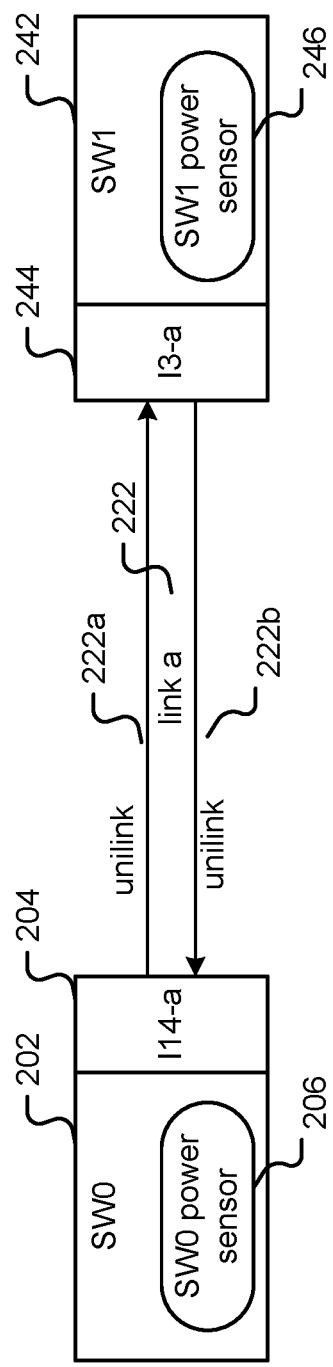
FIG. 2 is an example of a network created with element types to illustrate partial matching scenarios.

Partial Match Example. FIG. 2 is an example of a network created with element types to illustrate partial matching scenarios. In FIG. 2, two switches, switch0/SW0 (202) and switch1/SW1 (242), are each an instance of the Switch type described earlier. Each switch SW0 (202) and SW1 (242) is shown with one component interface, I14-a/eth14 (204) and I3-a/eth3 (244) respectively, and a power sensor for the switch, SW0 (206) and SW1 (246), respectively. Not shown in FIG. 2 may also be power sensors for the network interfaces (204, 244) if they are discretely powered.

In a real network, there may typically be multiple interfaces per switch and potentially many more switches. The Link (222) between these two connected interfaces is modeled as two component unidirectional links (222a and 222b), each an instance of Unilink. This level of detail allows the directionality of implication to be specified. It also allows for modeling faults such as one direction of a link failing while the other direction continues to function.

This simple model illustrates how a rule condition may be specified in an element type such as a Link (222) on which there may be no telemetry because there are no sensors on a link (222). Nevertheless, the associated subcondition may imply subconditions in intermediate elements such as unidirectional links and then to the connected interfaces to their parent switch, at which point they imply subconditions that are observable.

For example, a symptom of the current symptoms for a network is "loss of signal" being reported by a computer network switch on a particular one of its interfaces. The actual fault scenario of a "loss of signal" being reported by SW0 (202) on interface 114-a (204) may match to a fault scenario FS1 corresponding to there being a link failure in link a (222) between switch SW0 (202) and switch SW1 (242). However, the same symptoms may also match to a fault scenario FS2 in which the two interfaces (204, 244) at either end of the link have failed at the same time. It may also match to a fault scenario FS3 corresponding to the link failure in link a (222), but without ancillary symptoms considered, such as the symptoms corresponding to power loss at SW0 sensor (206) and SW1 sensor (246) being known to be false. Consequently, in this example, the matchset consists of FS1, FS2 and FS3. A tabular expression of this is:

| Label/Metadata | Symptoms | Root Cause |
| --- | --- | --- |
| FS1 | Loss of signal on (204) & no power loss at (206) & no power loss at (246). | Link a (222) failure |
| FS2 | Loss of signal on (204) & no power loss at (206) & no power loss at (246). | Both interfaces (204, 244) failed at same time. |
| FS3 | Loss of signal on (204). | Link a (222) failure |

Subsuming base scenarios by their associated derived scenarios. In one embodiment, an attribute of a potential fault scenario indicates when one potential fault scenario FSa is subsumed by another potential fault scenario FSb. That is, whenever FSb is matched, FSa would also be matched. As referred to herein, FSa is a base scenario and FSb is a derived scenario. In the case that both FSa and FSb are matched, a refinement of the matchset is to remove FSa from the matchset before translating the fault scenarios to their associated root causes.

To illustrate this case, the match refinement step would recognize, continuing the network example of FIG. 2, that FS3 is subsumed by FS1 because FS3 is requiring matching only a subset of the symptoms that FS1 is requiring.

| Label/Metadata | Symptoms | Root Cause Identifier |
| --- | --- | --- |
| FS1 (derived scenario) | Loss of signal on (204) & no power loss at (206) & no power loss at (246). | Link a (222) failure |
| FS2 | Loss of signal on (204) & no power loss at (206) & no power loss at (246). | Both interfaces (204, 244) failed at same time. |
| ~~FS3~~ (base scenario subsumed by FS1) | ~~Loss of signal on (204).~~ | ~~Link a (222) failure~~ |

Another simple example of a base scenario being subsumed by a derived scenario is a medical example:
- a potential fault scenario FSm shows a root cause of flu given the symptoms of high body temperature and aches with an 80% confidence level; and
- a potential fault scenario FSn shows a root cause of flu given the symptoms of high body temperature, aches, and headache with a 90% confidence level.

| Label/Metadata | Symptoms | Root Cause Identifier | Confidence Level |
|---|---|---|---|
| FSm (base scenario) | High body temperature & aches | Flu | 80% |
| FSn (derived scenario) | High body temperature & aches & headache. | Flu | 90% |

Thus, with an actual fault scenario including symptoms of high body temperature, aches, and headache, FSm is recognized as a base scenario subsumed by a derived scenario, FSn, and thus a root cause of flu with a 90% confidence level is output.

| Label/Metadata | Symptoms | Root Cause Identifier | Confidence Level |
|---|---|---|---|
| ~~FSm (base scenario)~~ Subsumed by FSn | ~~High body temperature & aches~~ | ~~Flu~~ | ~~80%~~ |
| FSn (derived scenario) | High body temperature & aches & headache. | Flu | 90% |

Combination of output probabilities. In one embodiment, a refinement may recognize that two potential fault scenarios that are present in the matchset are actually two different sets of symptoms for the same root cause, and in fact may both be true, so the output contains that potential root cause, possibly with an associated probability that is a combination of the probabilities of the two potential fault scenarios. For example, FSn may be a potential fault scenario showing a root cause of flu given symptoms of high body temperature, aches, and headache with a 90% confidence level and FSp may be a potential fault scenario showing a root cause of flu given symptoms of runny nose and ear aches with a 5% confidence level.

| Label/Metadata | Symptoms | Root Cause Identifier | Confidence Level |
|---|---|---|---|
| FSn | High body temperature & aches & headache. | Flu | 90% |
| FSp | Runny nose & ear aches. | Flu | 5% |

A patient with symptoms of high body temperature, aches, headache, runny nose, and ear aches may be recognized as a combination with an associated probability being a combination of the 90% confidence level and 5% confidence level. In one embodiment, the confidence levels may be linearly summed.

| Label/Metadata | Symptoms | Root Cause Identifier | Confidence Level |
|---|---|---|---|
| FSn | High body temperature & aches & headache. | Flu | 90% |
| FSp | Runny nose & ear aches. | Flu | 5% |
| Combination (FSn, FSp) | High body temperature & aches & headache & runny nose & ear aches. | Flu | 95% |

Alternative explanations. In one embodiment, an attribute of a potential fault scenario indicates when one potential fault scenario FSc is an alternative possibility to another potential fault scenario FSd. Thus, when both FSc and FSd occur in the matchset, the refinement would indicate these as part of a subset of alternative potential root causes for the actual fault scenario, as opposed to indicating the two matches as two separate possible faults and/or indicating the two matches as part of different root cause groups. In an embodiment, the attribute indicating a potential root cause as an alternative can be computed by comparing the symptoms of the two potential root causes. It is an alternative and has a subset of the symptoms of the other potential root cause and it is not a base root cause of the same, it is an alternative.

For example, using the Network Example of FIG. 2, refinement would indicate FS1 and FS2 as alternatives to each other, given that both scenarios correspond to a common set or subset of symptoms.

| Label/Metadata | Symptoms | Root Cause Identifier |
|---|---|---|
| FS1 (derived scenario) | Loss of signal on (204) & no power loss at (206) & no power loss at (246). | Link a (222) failure |
| FS2 (alternative explanation to FS1) | Loss of signal on (204) & no power loss at (206) & no power loss at (246). | Both interfaces (204, 244) failed at same time. |

Another simple example of an alternative explanation is a medical example:
- a potential fault scenario FSn shows a root cause of flu given the symptoms of high body temperature, aches, and headache with a 90% confidence level; and
- a potential fault scenario FSq shows a root cause of hayfever given symptoms of high body temperature, aches, and headache with a 3% confidence level;

| Label/Metadata | Symptoms | Root Cause Identifier | Confidence Level |
| --- | --- | --- | --- |
| FSn | High body temperature & aches & headache. | Flu | 90% |
| FSq | High body temperature & aches & headache. | Hayfever | 3% |

Thus with an actual fault scenario including symptoms of high body temperature, aches, and headache, FSq is recognized as an alternative explanation to FSn.

| Label/Metadata | Symptoms | Root Cause Identifier | Confidence Level |
| --- | --- | --- | --- |
| FSn | High body temperature & aches & headache. | Flu | 90% |
| FSq (alternative explanation to FSn) | High body temperature & aches & headache. | Hayfever | 3% |

In one embodiment, another attribute of a potential fault scenario is the probability of this fault scenario relative to its associated alternative fault scenarios. To illustrate, using the Network Example of FIG. 2, the probability of FS1 may be 0.95 and the probability of FS2 as an alternative to FS1 may be assigned 0.05. The matchset refinement may then order the associated root causes according to the probabilities associated with each of the alternatives. Thus, in the Network Example of FIG. 2, the refined root cause set may be:

[RC1:0.95,RC2:0.05]

wherein RC1 corresponds to the root cause associated with fault scenario FS1 and RC2 corresponds to the root cause associated with fault scenario FS2. The refinement eliminates a third entry because FS3 is subsumed by FS1.

| Label/Metadata | Symptoms | Root Cause Identifier | Confidence Level |
| --- | --- | --- | --- |
| FS1 (derived scenario) | Loss of signal on (204) & no power loss at (206) & no power loss at (246). | Link a (222) failure | 95% |
| FS2 (alternative explanation to FS1) | Loss of signal on (204) & no power loss at (206) & no power loss at (246). | Both interfaces (204, 244) failed at same time. | 5% |

Associating probabilities with the potential fault scenarios may be more feasible than the input probabilities approach because each fault scenario represents a situation in which a top-level failure requires remediation. Therefore, operational data may indicate the frequency with which a given root cause occurred compared to that of the alternatives, namely those with the same symptoms. For example, resuming Network Example of FIG. 2, if a broken link a (222) is the actual root cause 95 out of 100 times that the associated symptoms were observed, and only 5 out of those 100 times was it the case that it was actually the two interfaces (204, 244) failing at the same time, recorded operational data provides the basis of weighting and ordering these two alternative root causes with these probabilities.

Therefore, remedial action that first treats the output result as detecting a broken link a (222) would immediately address the actual root cause failure most of the time, and only 5 percent of the time would require going to the alternative fault remedial action. In some cases, such as the case of simultaneous failure of two interfaces (204, 244), a user may estimate the probability-based mean time to repair for an interface and the frequency of an individual interface failing and the number of interfaces, further qualifying with the likelihood that two interfaces failing within the same recovery window are actually on either ends of a link. Note that it is possible, although unlikely, that both the link has failed and the two interfaces have failed. That is, the alternative root causes may not be mutually exclusive. In this case, remedial actions for both faults are required.

Matching. In one embodiment, the matching of an actual fault scenario to a potential fault scenario, as performed by a matching mechanism, is exact in the sense that each matched potential fault scenario may be required to be such that the actual fault scenario satisfies for each symptom the symptom requirement specified in the matched potential fault scenario.

For example, if the potential fault scenario specifies a symptom S1 to be the temperature of an oven being greater than 100 Celsius, the actual fault scenario should include this symptom being reported as greater than 100 Celsius.

This matching contrasts with the input probability approach used for example, in traditional ARCA techniques, which there may be some probability that the symptom is true, even if the sensor is not reporting this, given the uncertainty about the sensor as captured by the associated probability. In one embodiment, generation of the matchset is performed by a ternary matching mechanism as described herein with the ternary RCT representation.

The unrefined fault scenario matchset may include multiple members even with matching a single actual fault in part because the set of potential fault scenarios should cover the cases in which some telemetry is missing or wrong. For example, FS3 in the Network Example above is provided so that there is some match even if telemetry for ancillary symptoms is not complete or incorrect. That is, it would be unacceptable to not be able to diagnose a link failure in link a (222) just because one (202) or the other of the switches (242) was unable to report on power (206, 246) to an interface.

In general, matching may be efficient to implement and match multiple independent root causes simultaneously as described in the above application regarding ternary fault scenario representation. Matching has the disadvantage that it fails to match when any specified symptom in the potential fault scenario that corresponds to the actual fault scenario does not match the symptoms determined from the telemetry. This may arise even when a human evaluation of the symptoms might quickly conclude what the root cause is.

Figure 3:
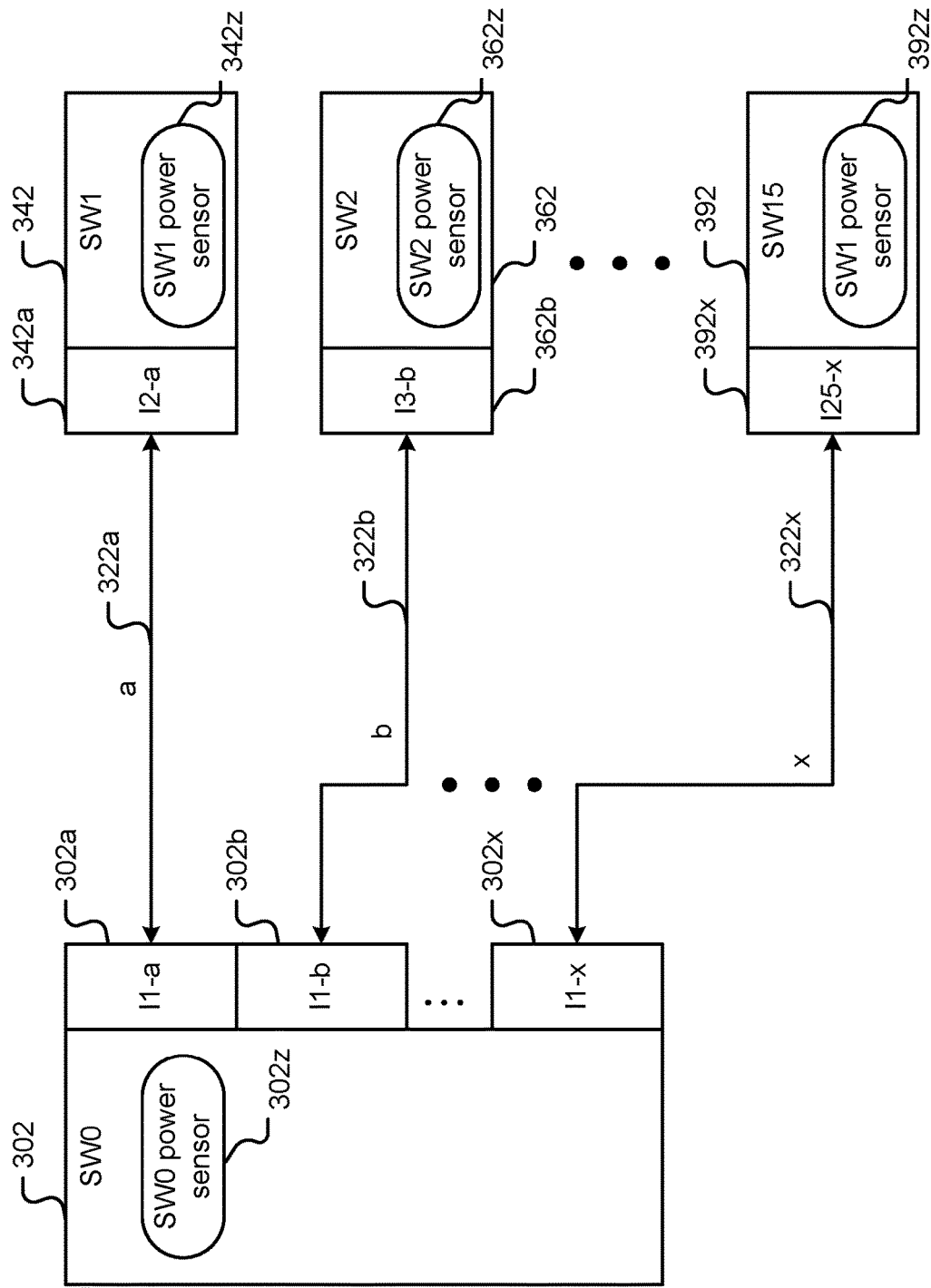
FIG. 3 is a block diagram illustrating a power example for further partial match examples.

Partial Matches. FIG. 3 is a block diagram illustrating a power example for further partial match examples. In this power example, a switch SW0 (302) is fully coupled via interfaces and links to 24 other switches SW1 (342), and SW2 (362) through SW15 (392). As shown before in FIG. 2, each switch, for example, switch SW0 (302) comprises a power sensor (302z) as well as one or more interfaces I1-a (302a), I1-b (302b), . . . , I1-x (302x) each corresponding to a link a (322a), b (322b), . . . , x (322x).

If the power to a computer network switch SW0 (302) including SW0 power sensor (302z) fails, one would expect that each interface to which the switch is connected over a link would detect a loss of signal. However, if the switch in question is connected over links to 24 separate interfaces I2-a (342a), I3-b (362b), . . . I25-x (392x), but only 23 of these interfaces are reporting loss of signal and a 24th one I25-x (392x) is missing from the telemetry, matching would fail matching to a potential fault scenario that specified all 24 separate interfaces having the symptom loss of power—even though it could reasonably be determined based on the symptoms that the switch had failed, and furthermore failed due to lack of power if that switch SW0 power sensor (302z) reported loss of power.

As shown herein, leveraging the ability of such matching to match to multiple fault scenarios at the same time in order to compensate for this disadvantage is important. In particular, besides having a potential fault scenario that corresponds to all the symptoms, potential fault scenarios are specified that correspond to partial matches for the same root cause. The extension to associated attributes with potential fault scenarios allows a refinement of the matchset to reduce the number of potential root causes that are actually output.

In particular, when a match to the full potential fault scenario occurs, the potential fault scenarios corresponding to partial matches of the same root cause are eliminated and/or subsumed. Similarly, the probability attribute associated with a potential fault scenario allows the output to efficiently indicate a lower confidence for a root cause in the output when it is present only because of what is effectively a partial match.

In one embodiment, approximate matching is used for a case in which not all features, for example subconditions, are necessarily known. Approximate matching can thus be used in conjunction with partial matching.

In one embodiment, approximate matching is provided by specifying a distance threshold parameter and outputting rows as matching if they are within the distance threshold according to some distance metric defined between a row and the mask. As will be described in further detail below, processing extra matches to reduce and organize matches for efficiency in interpretation may be improved by approximate matching in part by treating an approximate match at distance D, for example, as a base root cause relative to a match at distance D−1.

Partial-Match Potential Fault Scenarios (PMPFSs). A PMPFS is referred to herein as a potential fault scenario added to effectively handle partial matches with a matching mechanism. Various techniques define PMPFSs.

A PMPFS that omits one symptom. First, for each full potential fault scenario for a root cause, there may be for each symptom a PMPFS that omits one of the symptoms. For example, using the power example of FIG. 3, there may be a PMPFS for each neighboring interface which omits this interface as a symptom or alternately designates this symptom as a "don't care." For example, a PMPFS may omit I25-x (392x) as a "don't care" and thus with I2-a (342a), I3-b (362b), . . . , I24-w (not shown in FIG. 3) reporting a loss of signal, the system may conclude the switch SW0 (302) has failed.

It may be possible to go further and provide a PMPFS for a subset of symptoms of the full potential fault scenario. One example is to create a PMPFS for both I24-w and I25-x (392x) as "don't care." However, that may lead to an impractical number of PMPFSs in systems of realistic complexity. For example, in the example of a switch with 32 direct neighbor switches, there are basically 2 to the power of 32 or roughly 4 billion possible subsets. Here, approximate matching solves the issue with an excessive number of PMPFSs. Put another way, partial matching may be thought of as adding extra rows that are less complete, whereas approximate matching is parameterizing the match at least in part by relaxing the match criteria so one can match rows that do not exactly match the mask, or actual complete sets of symptoms.

A PMPFS that excludes a range of values. One method to effectively support partial matches while avoiding an exponential explosion in the number of PMPFSs is to allow a potential fault scenario to specify a given symptom as excluding some value, or a range of values. Typically values are used that would contradict the associated fault being the root cause. In the power example of FIG. 3, a PMPFS may be specified as requiring the lossOfSignal symptom to be either true or not known. Then, a match occurs as long as no neighbor switch is claiming to receive a signal from the switch that has supposedly lost power. That is, the match still takes place if this symptom is not known for some of the neighbor switches, for example I25-x (392x) which was unknown.

In one embodiment, the representation of a PMPFS allows the specification of exclusion-based matches, not just inclusion, in range specifications. For example, a two-bit representation of a value may use an "unknown but true" value, as [0,1], that is otherwise used to designate "not known to be true." In general, there exists traditional techniques for data representation that may be used to efficiently encode extra information that corresponds to exclusion as well as inclusion.

Restricting scope of a PMPFS. Another method to effectively support partial matches while avoiding an exponential explosion in the number of PMPFSs is to restrict the scope of a PMPFS and its symptoms and correspondingly reduce the probability associated with it. In the power example of FIG. 3, a PMPFS may be generated that matches on the current power failure sensor (302z) for the switch SW0 (302) and specifies "don't care" in effect for the telemetry of the neighbor switches (342, 362, . . . , 392). This PMPFS then matches if the power sensor (302z) reports a power failure yet there is contradictory information from one or more neighboring switches, such as an "unknown" for I25-x (392x), which may be incorrect or stale.

On the other hand, if the above PMPFS for the same switch SW0 (302) matches with an exclusion-based match, this lower probability match is filtered out by the refinement step. In general, the generation of a PMPFS may restrict the scope based on relationship to other elements, the types of the other elements, specific properties of these elements and other attributes.

Defining an aggregate symptom. Another method to effectively support partial matches while avoiding an exponential explosion in the number of PMPFSs is to define an aggregate symptom that is set based on telemetry across multiple sensor inputs. In the power example of FIG. 3, one may define an aggregate symptom that corresponds to more than some threshold K of neighboring switches SW1 (342), SW2 (362), . . . , SW15 (392) having loss signal from a given switch SW0 (302). Then, a PMPFS for switch loss of power may specify this aggregate symptom so that the switch has deemed to have had a power failure if most of its direct neighbors have loss signal from it. To be clear, the benefit of incorporating this information from its direct neighbors is that it helps disambiguate this case from that in which the current sensor on the switch has failed, not the power itself.

In one embodiment, a match operation accepts zero or more parameters that indicate criteria for accepting an approximate match on rows. An approximate row match is the result of comparing a given row to the specified mask where the row satisfies some matching criteria relative to the mask even though not every pair of entries may strictly match according to the definition of a match. A match operator is defined between two subconditions s0 and s1 to return true bool isMatching=match(s0,s1);

if every subcondition entry in s0 is either "don't care" or else matches as the value in the corresponding entry in s1. Note that the match operation is not commutative; match(a,b) may not necessarily be equal to match(b,a).

An approximate match operation on a table is the result of doing a row approximate match between the mask and each row of the table, and outputting those rows that satisfy the approximate match criteria. In one embodiment, a specified matching function is applied between the mask and a row that indicates whether the specified row approximately matches the mask. An approximate match of a mask against a table is performed by calling this matching function on each row of the table with the specified mask, and outputting those rows in the result set that match by this approximate match criteria.

In one embodiment, approximate matching is provided by specifying a distance threshold parameter and outputting rows as matching if they are within the distance threshold according to some distance metric defined between a row and the mask. For example, one distance metric would be $$d=2*N+1.0*P+0.5*R$$

where N is the number of entries in the row in which the mask is true and the entry is false or vice versa, P is the number of entries in the row which the entry is "not known to be true" and the mask is true, and R is the number of entries in the row in which the entry is known and the mask entry is unknown. The constants in front of these parameters may be specified in registers or variables and thus dynamically change depending on application needs. Many other distance metrics and associated parameters may be realized. In one embodiment, the approximate match operation computes the distance incrementally as it matches each entry in the row to the mask, and determines a mismatch as soon as the computed distance exceeds the distance threshold. In one embodiment, the distance metric is specified as a relative percentage instead of an absolute value.

This approximate matching contrasts with the use of distance in traditional binary matching for root cause analysis, where for example the row with the shortest Hamming distance to the mask across all the rows is selected after comparing to each row. In particular, as described herein there is instead a distance threshold that is applied per row. Another difference is that as described herein the distance measure is flexible and not only restricted to one particular distance metric such as Hamming distance.

In one embodiment, any distance metric may be provided for approximate matching, and better fitted to a specific application. A maximum distance parameter may be specified, so only those rows that are at a distance that is at most as large as this maximal distance are returned in the result of the match. For example, if there is no exact match to a given mask with distance of at most one, an application may query the matches that are at most distance of two, to see if any row now matches.

As a special case of a distance metric, each mismatch adds one to the distance so the distance is simply the number of mismatches that are allowed per row before the row is declared a mismatch. For example, in the above example of the Medical Diagnosis Application, a threshold of one would allow a match of K−1 subconditions by accepting a row matching if it only mismatched entries in zero or one entries relative to the mask.

In some implementations, the distance threshold would be provided to the match operation. When beginning the match operation of the mask against a next row, the match operation would initialize a distance variable to zero. Then, it would proceed to match the mask against the row, entry by entry. On an entry mismatch, the processing would increment the distance variable by the cost of the mismatch. It would then compare the variable against the distance threshold. If the variable is now greater than the distance threshold, it would declare the row as not matching and continue with the next row in the table. It would otherwise continue with the entry-wise matching in that row. In one embodiment, matching a mask against a row instead of entry by entry is block by block, where the block structure is a fixed-length (e.g., 32-bit or 64-bit wide) representation of a plurality/concatenation of values for compact memory representation.

In one embodiment, different distance parameters are for different types of mismatches. In particular, there is an unknownDistance threshold parameter and a knownDistance threshold parameter where the former applies when the row entry contains a known value and the corresponding mask entry contains an unknown entry, while the latter applies when the mismatch arises because of different known values in the row entry and the corresponding entry in the mask. A separate parameter may deal with the "not known to be true" value or it may be handled under one of the existing thresholds.

In one embodiment, approximate matching includes specifying a strength threshold parameter and computing, on each row, a strength associated with the match between the row and the mask according to some strength function. A row is deemed to match the mask if the strength of its match is equal to or greater than the specified strength threshold value. In one embodiment, the strength threshold value is specified as a relative percentage instead of an absolute value.

As with distance, a variety of strength functions are possible. In a particular embodiment, the weight for a match is simply one and so the strength of the match corresponds to the minimum number of entries required to match in order for the row to be declared a match. For example, in the above example of a Medical Diagnosis Application, a strength of three would accept a row as matching if it matched on at least three entries. For example, if a patient is observed to have these three symptoms, the approximate match result set of rows would indicate the possible diseases to consider. Moreover, if the match result returns multiple rows, the subcondition differences between these rows can indicate which subconditions to test for that would most effectively differentiate between these matched rows in order to narrow the diagnosis.

For example, if the match result rows differ on a subcondition that can be determined by a blood test, the doctor can order a blood test for the patient to efficiently refine the diagnosis. With the results of the blood test, the approximate match can be run again with the additional subcondition(s) specified in the mask and a larger strength value, producing a new match result set that provides a more accurate or refined diagnosis. If necessary, this sequence of actions may be repeated to further refine the diagnosis. In one embodiment, the strength may not be set to be larger than the number of entries that are set in the mask because it is then not possible for the mask to match that many entries, at least with the weights of one per match.

In one embodiment, different threshold parameters are used for the strength of different types of matches/mismatches, similar to the different distance thresholds. For example, there may be an exactMatchStrength threshold that requires that a row match exactly on at least that many entries. An alternative approach is to have a factor for the exact match case in the strength computation that is set high enough that other mismatches may not generally compensate for the lack of exact matches. For example, if the factor for an exact match is 1000 and the other mismatches have very small strength, setting the strength threshold to 4000 means that a mask must have at least 4 exact matches.

In one embodiment, weights are associated with the table entries. When a match operation is invoked, for each row to be matched, the match initializes a currentStrength variable to zero. Then, for each entry in the row that matches the mask, the currentStrength variable is updated as a function of the weight associated with this entry. The resulting weight is then compared to the strength threshold parameter. If currentStrength is greater than or equal to the value of the strength threshold parameter, the row is treated as matched. Otherwise, the matching continues to match against the row entries.

In one embodiment, a different weight is associated with matching an entry based on the nature of the match. For example, matching a row entry because it specifies a "don't care" value may have a different weight than matching to the row entry because of a known value that is true or false. In one embodiment, a parameter to the match operation indicates the weight for a "don't care" entry match. A weight of zero effectively means that "don't care" matches have no effect on the computed weight.

In one embodiment, a potentially negative weight is associated with mismatches to an entry. For example, one specified weight may be used when the mismatch corresponds to false in the row entry and unknown in the mask entry, and yet another may be used when the mismatch corresponds to false in the row entry and true in the corresponding mask entry.

In one embodiment, the weights associated with entries in the table are specified by a weight matrix corresponding to a group of columns and rows in the table. For example, the weight matrix may be initialized so that the weightMatrix [i,j] entry comprises the weight for an entry that is in the i-th range of rows and the j-th range of columns.

In one embodiment, a parameter to the match operation indicates if the parameter is true then a specified/known entry in the mask matching to a "don't care" entry in the row increments the currentStrength variable, and otherwise the currentStrength variable is unchanged. To effectively disable the strength mechanism, the match operation would be invoked with this parameter set to true and the strength parameter set to the number of specified/known entries in the mask.

In one embodiment, both the distance threshold and strength threshold parameters are supported. The implementation has the two separate counters and performs the processing specified above for mismatches as well as for matches. Used together, the match operation may return all/approximate matches that have a strength over the specified threshold and under the specified distance from the mask. These distance and strength threshold parameters can specify percentages, rather than absolute values. For example, the percentage may be specified relative to non-"don't care" entries in a row being matched.

In one application, when the strength threshold parameter is set, the distance threshold parameter is set to a large value, so it is effectively disabled from the prevention of a row match because of mismatches. For example, in the Medical Diagnosis Application, the number of extra subconditions associated with a given row does not matter; what is wanted is the match to indicate what rows, as potential diagnoses, to consider to determine the further tests to narrow the diagnosis. In this case, the entry mismatches may occur because the mask entries are unknown because these tests have not yet been performed. When the distance threshold parameter is used, the match operation may be configured to treat a mismatch below the mismatch threshold as a match from the standpoint of the strength parameter. Therefore, a mask with K entries set and a mismatch threshold of three may match as expected if the strength threshold is set to K because the up-to-three mismatched entries would count as matches in the computation of the strength.

In one embodiment, different distance thresholds are associated with different subsets of the entries of the table. The match operation then maintains a distance variable for each different subset and treats a mismatch in each subset as a match until the distance threshold for the subset is reached or a row match is determined. In one embodiment, a distanceThreshold matrix stores these different thresholds, where the row of this matrix corresponds to a subset of the rows in the table and each column corresponds to a subset of columns in the table. Then, when a mismatch occurs on an entry in a row, the match operation increments the distance variable associated with that entry and compares the result against the threshold stored in this distanceThreshold matrix entry, declaring a mismatch if this count is larger than the threshold value. In one embodiment, subsets are determined by ranges of indexes on the columns and indexes.

To illustrate utility of different thresholds, consider again the Medical Diagnosis Application. The subcondition table may be organized such that the least common or most detailed subconditions/symptoms occur in the first half of the columns. It may also be organized so that the most well-understood diseases and disorders occur in the initial rows of the table. Then, the distanceThreshold matrix can specify a lower distance threshold for the common subconditions associated with rows corresponding to well-understood diseases and higher distance thresholds for less common subconditions associated with less-well understood diseases as well as suitable thresholds for the other combinations. A similar approach may be used to support multiple strength thresholds associated with different subsets of the entries of the table.

In one embodiment, the columns in the table are ordered to facilitate efficient matching. For example, using the above example of the Medical Diagnosis Application, the subconditions that are least common may be put in an initial range of columns. This "least common" property may be determined by examining all the rows and counting the number of rows in which each subcondition occurs. A distance threshold then may be associated with this range of columns, rather than requiring a more complex mapping from entry to distance threshold. This ordering also means that the matching operation on a row frequently terminates early when the row matching proceeds through the row sequentially, thereby being more efficient than if the most common subconditions occur first.

As referred to herein, a sparse matrix is any matrix that has more zero entries in the matrix than non-zero entries. Approximate matching may be implemented using the techniques of sparse-matrix-vector multiplication (SPVM) in which the multiply operation is replaced by the match computation. This may be either: the vector multiply operation applied to each pair of the vectors/rows being matched; or an entry-level multiply operator. In the latter case, the addition of the results is replaced by the appropriate distance or strength computation. The resulting vector indicates those matched by the entries that are within threshold. Clearly, exact matching can also be realized with this method by suitable setting of thresholds. As an example of applying the above techniques, for a GPGPU (General-purpose computing on graphics processing unit (GPU)) implementation, the same representation of the table as a matrix and mask as a vector can be used as for an SPMV GPU implementation, just replacing the kernel with the matching computation, rather than the entry or vector multiplication.

In various embodiments, a variety of approximate match functions may be provided, and that multiple functions may be applied at the same time per row, such as the distance and strength computations mentioned earlier, and different approximate match functions may be used depending on the row.

Performance impact on matching may be minimal because these computations do not cause significant additional accesses to memory unless there is a large number of entry-specific thresholds, which is not expected to be required. Even for a hardware implementation, the additional implementation complexity may be minimal because it is primarily a matter of an accumulator register per threshold and logic to increment and compare against this accumulator as the matching is performed.

Also, a variety of orderings of column and rows may be applied to minimize the cost of matching, including groupings of rows so that certain match operations only have to match against a subset of the table rows.

Traditionally, other unrelated work on "approximate matching" has focused on approximate string matching in which it is a matter of matching an input string of values/characters to a given internal string. There is often a table of such internal strings to match against, each of which could be considered a row. By contrast to the disclosed, the values/characters are not identified with columns so there is no concept of "corresponding" entries between the two strings being matched. In the disclosed application, each value in the mask and a row are instead associated with a column with semantic meaning in the form of a subcondition, and the comparison is pair-wise between entries in the mask and row in the corresponding column.

Figure 4A:
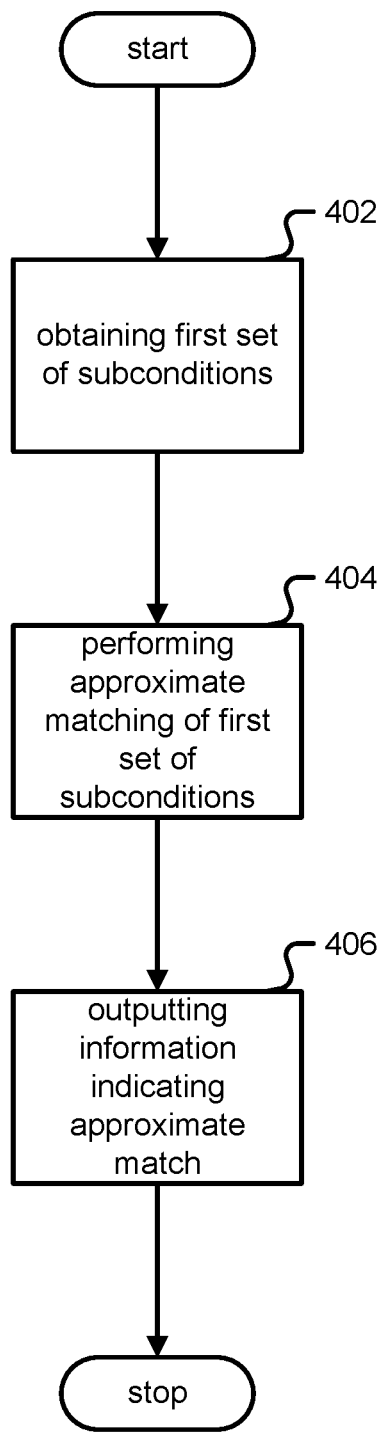

FIGS. 4A, 4B, and 4C are flow charts illustrating an embodiment of a process for approximate matching. In one embodiment, the system of FIG. 1 carries out the processes of FIGS. 4A, 4B, and 4C. For example, the process for approximate matching may be used for the Medical Diagnosis Application described above as a practical application.

In step (402) of FIG. 4A, a first set of subconditions is obtained. In one embodiment, the first set of subconditions comprises subconditions to be matched. In step (404) of FIG. 4A, approximate matching is performed of the first set of subconditions against a plurality of sets of subconditions. The subconditions may be obtained for a user and/or administrator for the practical application, for example a nurse, doctor, and/or scientist associated with a root cause analysis. In one embodiment, the match described herein is a match of database rows.

In one embodiment, the process of FIG. 4B is used to implement step (404) of FIG. 4A: In step (422) of FIG. 4B, a second set of subconditions among the plurality of sets of subconditions is accessed, wherein a representation of a subcondition in the first set and/or the second set of subconditions comprises a value having one of a plurality of states, and wherein the plurality of states comprises a state of "don't care." In one embodiment, the second set of subconditions comprises a rule corresponding to a row in a table of rules, or a root cause corresponding to a row in a table of root causes. In one embodiment, the value is represented by a single bit and/or an ANDN hardware instruction is used to match two values. In one embodiment, the value is represented by two bits. In one embodiment, the plurality of states further includes a state of "true." In one embodiment, the second set of subconditions is among a plurality of sets of subconditions under evaluation.

In step (424) of FIG. 4B, the first set of subconditions is approximately matched against the second set of subconditions.

In one embodiment, the process of FIG. 4C is part of step (424) of FIG. 4B: In step (442) of FIG. 4C, the first set of subconditions is compared against the second set of subconditions. In one embodiment, the comparing includes an exact comparison. In one embodiment, comparing the first set of subconditions against the second set of subconditions comprises comparing entry by entry, row by row, and/or comprises comparing block by block.

In step (444) of FIG. 4C, a matching criterion is determined to be met based on a result of the matching. In one embodiment, the matching criterion can be met in cases with an exact match, so that the exact match would produce a result for the approximate match. In a step not shown, approximate matching is repeated for other rules in the plurality of rules. In one embodiment, the approximate match of a mask to a row is indicated as the result of a specified matching function.

In one embodiment, the approximate match is found when a row is under a distance threshold from the mask. In one embodiment, the approximate match is found when a row has at most N mismatched entries. In one embodiment, the approximate match is found when a row has a strength of match that is equal to or greater than a specified strength threshold. In one embodiment, the approximate match is based on parameters that depend on the column and/or row of entries being matched. In one embodiment, the columns and/or rows are organized to allow a simple mapping from parameters to a mapped entry. In one embodiment, the approximate matching includes applying a specialized SPVM with the multiply operator computing a metric corresponding to distance or strength.

In step (406) of FIG. 4A, information is output indicating that the second set of subconditions is at least an approximate match for the first set of subconditions.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
obtaining a first set of subconditions for a root cause analysis;
wherein each subcondition of the first set of subconditions comprises a mask value having a mask plurality of states, wherein the mask plurality of states comprises a state of "don't care";

performing approximate matching of the first set of subconditions against a plurality of sets of subconditions, comprising:
   accessing a second set of subconditions among the plurality of sets of subconditions;
   wherein each subcondition of the second set of subconditions comprises a value having one of a second plurality of states, wherein a table value is the value, and wherein the second plurality of states comprises a state of "don't care"; and
   approximately matching the first set of subconditions against the second set of subconditions, comprising:
     comparing the first set of subconditions against the second set of subconditions;
     determining that a matching criterion is met based at least in part by applying a specialized sparse matrix-vector multiplication (SpMV) that replaces a multiply operator with a match computation;
     wherein the match computation comprises a non-commutative operation, at least in part by using a GPGPU (general-purpose computing on graphics processing unit) implementation wherein the plurality of sets of subconditions are represented as a matrix, the first set of subconditions is represented as a vector, and the GPGPU kernel is replaced with the match computation; and
     wherein the match computation comprises a match operator output table comprising a no-match output in the event an input mask value is "don't care" and an input table value is "true";
   determining the second set of subconditions is at least an approximate match for the first set of subconditions;
   displaying the approximate match to guide repairing a physical system associated with the second set of subconditions; and
   repairing the physical system via remedial action based at least in part on the approximate match.

2. The method of claim 1, wherein the first set of subconditions comprises subconditions to be matched.

3. The method of claim 1, wherein the second set of subconditions comprises a rule corresponding to a row in a table of rules, or a root cause corresponding to a row in a table of root causes.

4. The method of claim 1, wherein the value is represented by a single bit.

5. The method of claim 1, wherein the value is represented by a single bit and an ANDN hardware instruction is used to match two values.

6. The method of claim 1, wherein the value is represented by two bits.

7. The method of claim 1, wherein comparing the first set of subconditions against the second set of subconditions comprises comparing entry by entry and/or comprises comparing block by block.

8. The method of claim 1, wherein the matching criterion can be met in cases with an exact match, so that the exact match would produce a result for the approximate match.

9. The method of claim 1, wherein the second plurality of states further includes a state of "true".

10. The method of claim 1, wherein an approximate match of a mask to a row is indicated as a result of a specified matching function.

11. The method of claim 1, wherein the approximate match is determined based on a row being under a distance threshold from a mask.

12. The method of claim 11, wherein the distance threshold is a percentage.

13. The method of claim 1, wherein the approximate match is determined based on at most N mismatched entries, N being a natural number.

14. The method of claim 1, wherein the approximate match is determined based on a row having a strength of match that is equal to or greater than a specified strength threshold.

15. The method of claim 14, wherein the specified strength threshold is a percentage.

16. The method of claim 1, wherein the approximate match is based on parameters that depend on a column and row of entries being matched.

17. The method of claim 1, wherein columns and/or rows are organized to allow a simple mapping from parameters to a mapped entry.

18. The method of claim 1, wherein the approximately matching of the first set of subconditions against the second set of subconditions includes applying a specialized sparse matrix-vector multiplication with a multiply operator computing a metric corresponding to distance or strength.

19. The method of claim 1, wherein the mask value and the table value are each represented by one bit.

20. The method of claim 1, wherein the match computation comprises an ANDN hardware instruction wherein a "don't care" value is represented by 0 and a "true" value is represented by 1.

21. The method of claim 20, wherein a complement of an ANDN of the first set of subconditions and the second set of conditions is used for the match computation.

22. A system, comprising:
a display;
a processor coupled to the display and configured to:
   obtain a first set of subconditions for a root cause analysis;
   wherein each subcondition of the first set of subconditions comprises a mask value having a mask plurality of states, wherein the mask plurality of states comprises a state of "don't care";
   perform approximate matching of the first set of subconditions against a plurality of sets of subconditions, comprising:
     accessing a second set of subconditions among the plurality of sets of subconditions;
     wherein each subcondition of the second set of subconditions comprises a value having one of a second plurality of states, wherein a table value is the value, and wherein the second plurality of states comprises a state of "don't care"; and
     approximately matching the first set of subconditions against the second set of subconditions, comprising:
       comparing the first set of subconditions against the second set of subconditions;
       determining that a matching criterion is met based at least in part by applying a specialized sparse matrix-vector multiplication (SpMV) that replaces a multiply operator with a match computation;
       wherein the match computation comprises a non-commutative operation, at least in part by using a GPGPU (general-purpose computing on graphics processing unit) implementation wherein the plurality of sets of subconditions are represented as a matrix, the first set of subconditions is represented as a vector, and the GPGPU kernel is replaced with the match computation; and wherein the match computation comprises a match operator output table comprising a no-match output in the event an input mask value is "don't care" and an input table value is "true";

determine the second set of subconditions is at least an approximate match for the first set of subconditions;

display the approximate match to guide repairing a physical system associated with the second set of subconditions; and repair the physical system via remedial action based at least in part on the approximate match.

23. A computer program product, the computer program product being embodied in a non-transitory computer readable storage medium and comprising computer instructions for:

obtaining a first set of subconditions for a root cause analysis;

wherein each subcondition of the first set of subconditions comprises a mask value having a mask plurality of states, wherein the mask plurality of states comprises a state of "don't care";

performing approximate matching of the first set of subconditions against a plurality of sets of subconditions, comprising:

accessing a second set of subconditions among the plurality of sets of subconditions;

wherein each subcondition of the second set of subconditions comprises a value having one of a second plurality of states, wherein a table value is the value, and wherein the second plurality of states comprises a state of "don't care"; and approximately matching the first set of subconditions against the second set of subconditions, comprising:

comparing the first set of subconditions against the second set of subconditions;

determining that a matching criterion is met based at least in part by applying a specialized sparse matrix-vector multiplication (SpMV) that replaces a multiply operator with a match computation;

wherein the match computation comprises a non-commutative operation, at least in part by using a GPGPU (general-purpose computing on graphics processing unit) implementation wherein the plurality of sets of subconditions are represented as a matrix, the first set of subconditions is represented as a vector, and the GPGPU kernel is replaced with the match computation; and wherein the match computation comprises a match operator output table comprising a no-match output in the event an input mask value is "don't care" and an input table value is "true";

determining the second set of subconditions is at least an approximate match for the first set of subconditions;

displaying the approximate match to guide repairing a physical system associated with the second set of subconditions; and repairing the physical system via remedial action based at least in part on the approximate match.

* * * * *